United States Patent
Jaganathan et al.

(10) Patent No.: US 7,848,450 B2
(45) Date of Patent: Dec. 7, 2010

(54) METHODS AND APPARATUS TO PRE-COMPENSATE FOR I/Q DISTORTION IN QUADRATURE TRANSMITTERS

(75) Inventors: Shrinivasan Jaganathan, Richardson, TX (US); Michael James Arnold, Lucas, TX (US); Francesco Dantoni, Atella (IT)

(73) Assignee: Texas Instruments Incorporated, Dallas, TX (US)

( * ) Notice: Subject to any disclaimer, the term of this patent is extended or adjusted under 35 U.S.C. 154(b) by 831 days.

(21) Appl. No.: 11/726,607

(22) Filed: Mar. 22, 2007

(65) Prior Publication Data

US 2009/0010358 A1  Jan. 8, 2009

(51) Int. Cl.
*H02K 1/02* (2006.01)
(52) U.S. Cl. .................................. 375/296
(58) Field of Classification Search ............ 375/296, 375/297, 298, 345, 349
See application file for complete search history.

(56) References Cited

U.S. PATENT DOCUMENTS

| | | | |
|---|---|---|---|
| 5,847,619 A * | 12/1998 | Kirisawa | 332/103 |
| 6,337,888 B1 | 1/2002 | Huang et al. | |
| 6,337,974 B1 * | 1/2002 | Inamori et al. | 455/126 |
| 7,333,557 B2 * | 2/2008 | Rashev et al. | 375/296 |
| 2003/0109222 A1 | 6/2003 | Sun et al. | |
| 2004/0242178 A1 | 12/2004 | Kim et al. | |
| 2006/0215783 A1 | 9/2006 | Shako et al. | |

* cited by examiner

*Primary Examiner*—Kevin Y Kim
(74) *Attorney, Agent, or Firm*—John J. Patti; Wade J. Brady, III; Frederick J. Telecky, Jr.

(57) ABSTRACT

Methods and apparatus to pre-compensate for in-phase/quadrature (I/Q) distortion in quadrature transmitters are disclosed. A disclosed example method comprises coupling a portion of an analog baseband in-phase signal to an analog baseband quadrature signal through an impedance, and selecting a resistance value for the impedance to pre-distort the analog baseband quadrature signal to compensate for an error introduced by modulation of the analog baseband in-phase signal and the analog baseband quadrature signal.

13 Claims, 4 Drawing Sheets

METHODS AND APPARATUS TO PRE-COMPENSATE FOR I/Q DISTORTION IN QUADRATURE TRANSMITTERS

FIELD OF THE DISCLOSURE

This disclosure relates generally to quadrature transmitters, and, more particularly, to methods and apparatus to pre-compensate for in-phase/quadrature (I/Q) distortion in quadrature transmitters.

BACKGROUND

Gain and phase mismatches between an in-phase (i.e., I) path and a quadrature (i.e., Q) path of a quadrature transmitter (i.e., I/Q mismatch) may result in an output having one or more undesired frequencies, images and/or sidebands in addition to a desired signal. Such undesired frequencies, images and/or sidebands can cause a degradation and/or distortion of the desired signal (i.e., I/Q distortion). For example, an undesired frequency, image and/or sideband may cause a receiver error, and/or to violate an emission mask that specifies allowed transmitted power at particular frequencies. Typically, the analog portions of a quadrature transmitter (e.g., an analog modulator) contribute the majority of the I/Q mismatch. In some circumstances the I/Q mismatch may vary over time with, for example, ambient temperature. While analog circuit induced I/Q mismatch may be digitally corrected by, for example, a digital signal processor or other hardware prior to conversion to the analog domain, digital correction requires access to digital transmit signals that may not be available to the engineer designing, tuning and/or testing a quadrature transmitter.

DETAILED DESCRIPTION

Figure 1:
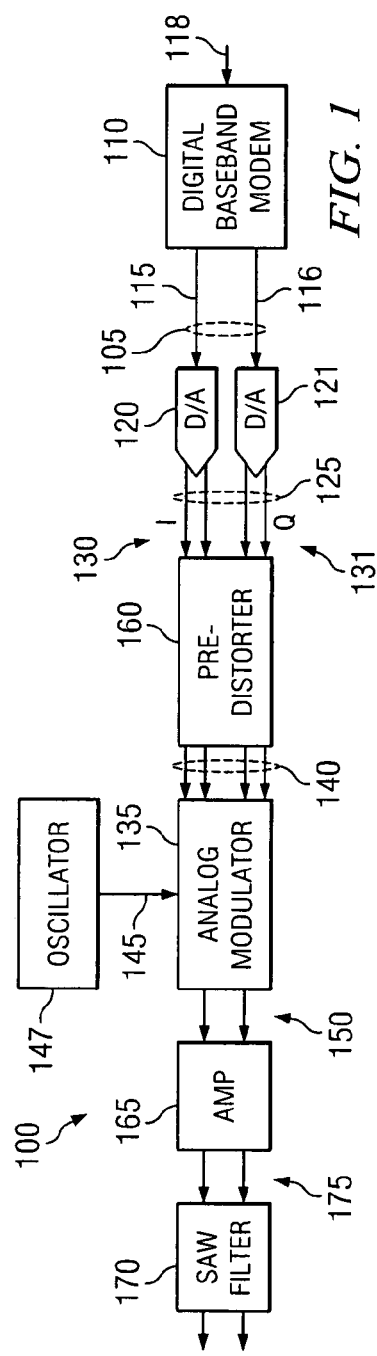
FIG. 1 is a schematic diagram of example quadrature transmitter constructed in accordance with the teachings of the invention.

FIG. 1 is a schematic diagram of an example quadrature transmitter 100. To generate a quadrature signal 105 to be transmitted, the example quadrature transmitter 100 of FIG. 1 includes any type of digital baseband modem 110. The example quadrature signal 105 of FIG. 1 includes an in-phase component 115 and a quadrature component 116 that collectively represent one or more data bits and/or bytes 118 to be transmitted to a remote receiver (not shown). The example digital baseband modem 110 of FIG. 1 performs, among other things, framing, error correction encoding and/or constellation encoding.

To convert the in-phase and quadrature components 115, 116 from the digital domain to the analog domain, the example quadrature transmitter 100 of FIG. 1 includes any number and/or type(s) of digital up-converter(s) (not shown), digital-to-analog converter(s) (DAC(s)) 120 and 121, and analog filter(s) (not shown). Collectively, the example DACs 120 and 121 of FIG. 1 convert the digital quadrature signal 105 to an analog quadrature signal 125. In particular, the example DAC 120 converts the digital in-phase component 115 to an analog in-phase component 130. Likewise, the example DAC 121 converts the digital quadrature component 116 to an analog quadrature component 131. The example analog signals of FIG. 1 (e.g., the example analog components 130 and 131) are implemented using differential signals (e.g., each signal is composed of a positive signal and a negative signal), and are illustrated in FIG. 1 with parallel sets of lines. However, persons of ordinary skill in the art will readily appreciate that a quadrature transmitter 100 may, additionally or alternatively, be implemented using single-ended analog signals and/or any combination of differential and single-ended analog signals.

To modulate quadrature analog signals, the example quadrature transmitter 100 of FIG. 1 includes any type of analog modulator 135. Using any number and/or type(s) of circuit(s), logic and/or component(s), the example analog modulator 135 of FIG. 1 modulates an input quadrature analog signal 140 with a local oscillator signal 145 to form a modulated analog signal 150. The example local oscillator signal 145 of FIG. 1 may be a sinusoidal signal that is provided by any type of oscillator 147. As illustrated in the example of FIG. 1, the modulated analog signal 150 may be further amplified (e.g., by a variable gain radio-frequency (RF) amplifier 165) and filtered (e.g., by a surface acoustic wave (SAW) filter 170) prior to being transmitted via any type(s) and/or number of RF antennas (not shown). The example SAW filter 170 of FIG. 1 attenuates undesired frequencies, images and/or sidebands present in the output 175 of the example amplifier 165. The portion(s) of the signal 175 that are attenuated by the example SAW filter 170 depends upon the frequency of the local oscillator signal 145 and the passband and stopband characteristics of the SAW filter 170. For example, the frequency of the local oscillator 145 may be set, controlled and/or adjusted so that normally error signals (e.g., undesired frequencies, images and/or sidebands) of the output signal 175 are passed through the SAW filter 170 while normally desired signals are attenuated by the SAW filter 170.

Due to, for example, component mismatches within the analog modulator 135, the example analog modulator 135 of FIG. 1 may introduce errors (e.g., phase and/or amplitude) between the in-phase and quadrature components of the input quadrature analog signal 140 during, for example, amplification and/or modulation of the in-phase and/or the quadrature components. Such I/Q mismatches, I/Q distortion and/or I/Q errors may result in, for example, one or more error signals (e.g., undesired frequencies, images and/or sidebands) being present in the output signal 150 of the analog modulator 135.

To pre-distort the analog quadrature signal 125 prior to being modulated by the analog modulator 135, the example quadrature transmitter 100 of FIG. 1 includes a pre-distorter 160. The example pre-distorter 160 of FIG. 1 couples (e.g., adds) a portion of the analog in-phase component 130 to the analog quadrature component 131, and/or couples (e.g., adds) a portion of the analog quadrature component 131 to the analog in-phase component 130. The example pre-distorter 160 of FIG. 1 may be implemented using one or more resistors and/or amplifiers coupled in any number of configurations between the negative and/or positive portions of the in-phase and quadrature analog signals 130 and 131. The portion(s) of the in-phase and quadrature components 130 and 131 added and/or coupled together depends upon the amount and/or type of I/Q distortion introduced by the analog modulator 135. In the illustrated example of FIG. 1, the pre-distorter 160 selects, scales, couples and/or adds the portions to reduce the signal power of one or more error signals (e.g., undesired frequencies, images and/or sidebands) present in the modulated output signal 150. Example manners of implementing the example pre-distorter 160 of FIG. 1 are described below in connection with FIGS. 3A and 3B.

While an example manner of implementing a quadrature transmitter is illustrated in FIG. 1, the quadrature transmitter 100 may be implemented using any number and/or type(s) of alternative and/or additional processors, devices, components, circuits, modules, interfaces, etc. Further, the processors, devices, components, circuits, modules, elements, interfaces, etc. illustrated in FIG. 1 may be combined, re-arranged, eliminated and/or implemented in any other way. For example, the example pre-distorter 160 may be implemented together with the example analog modulator 135 within a single integrated circuit (IC). Additionally, the example quadrature transmitter 100 may include additional processors, devices, components, circuits, interfaces and/or modules than those illustrated in FIG. 1 and/or may include more than one of any or all of the illustrated processors, devices, components, circuits, interfaces and/or modules.

Figure 2:
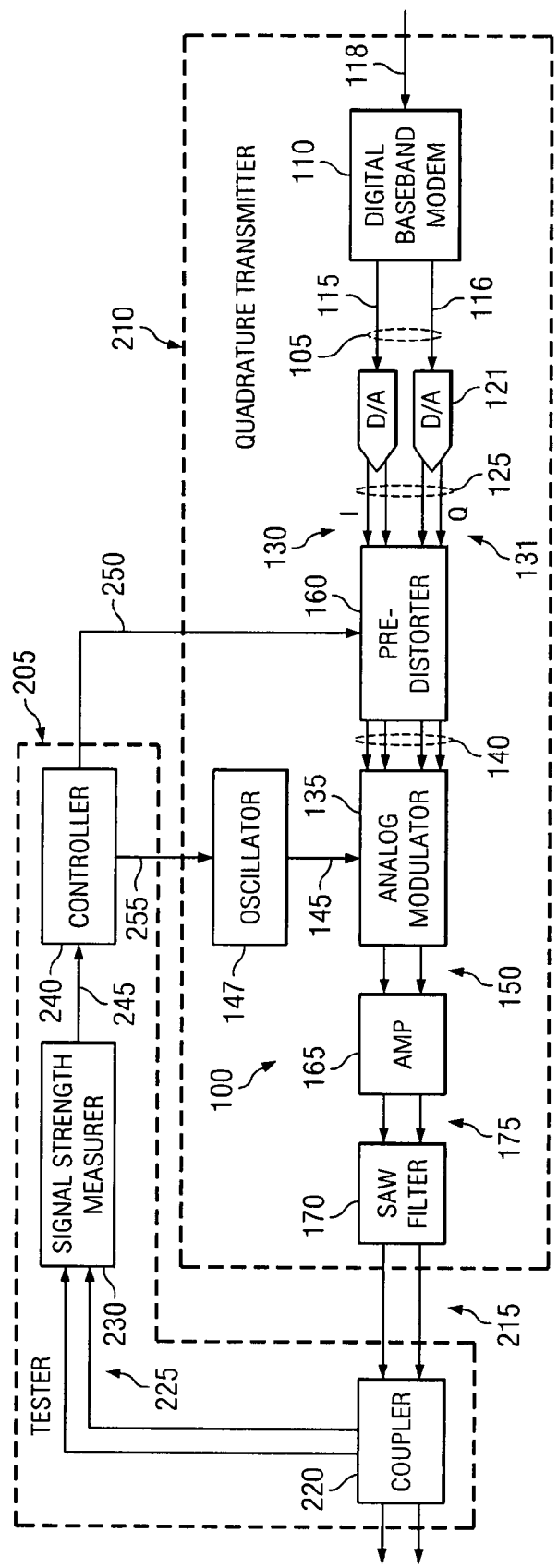
FIG. 2 is a schematic diagram of an example tester that may be used to test, control and/or adjust a quadrature transmitter.

FIG. 2 illustrates is a schematic diagram of an example tester 205 that may be used to adjust and/or control the analog pre-distorter 160 of a quadrature transmitter 210. As described below, the example tester 205 of FIG. 2 may be used as a factory test fixture to calibrate the pre-distortion before product is shipped, and/or may be implemented within a device that includes the quadrature transmitter 210. Because elements of the example quadrature transmitter 210 of FIG. 2 are identical to the quadrature transmitter 100 described above in connection with FIG. 1, the description of the identical elements is not repeated here. Instead, identical elements of the quadrature transmitters 100 and 210 are illustrated with identical reference numerals in FIGS. 1 and 2, and the interested reader is referred back to the descriptions presented above in connection with FIG. 1 for a complete description of those like numbered elements.

To obtain a portion of an output 215 of the example quadrature transmitter 210, the example tester 205 of FIG. 1 includes any type of bi-directional coupler 220. The example coupler 220 of FIG. 2 is inserted at the output of the quadrature transmitter 210 prior to, for example, a transmit RF antenna (not shown) and reflects and/or couples a portion of the output 215 to a signal strength measurer 220. The example coupler 220 couples one percent of the output signal 215 to the signal strength measurer 230 and passes ninety-nine percent (e.g., 20 decibels (dB)) of the output signal 215 to the RF antenna. However, a coupler 220 having any coupling ratio may be used.

To measure the strength of the coupled signal 225, the example tester 205 of FIG. 2 includes any type of signal strength measurer 230. The example signal strength measurer 230 of FIG. 3 implements any type of logarithmic amplifier circuit to determine and/or measure the signal strength of the coupled signal 225.

To adjust and/or control the pre-distortion performed by the example pre-distorter 160, the example tester 205 of FIG. 2 includes a controller 240. The example controller 240 of FIG. 2 receives one or more signals and/or values 245 that represent the strength of the coupled signal 225 from the example signal strength measurer 230. Based upon the received signals and/or values 245, the example controller 240 adjusts, sets and/or controls one or more parameters and/or registers of the example pre-distorter 160 to adjust the pre-distortion performed by the pre-distorter 160. For example, the controller 240 can write one or more digital control words 250 to the pre-distorter 160 to set the resistance(s) of one or more digital potentiometers. The digital control words 250 may be stored in, for example, a (re-) programmable non-volatile memory within the pre-distorter 160 such that whenever the pre-distorter 160 is activated (e.g., powered-on) and/or reset the control words 250 can be read from the non-volatile memory and the desired resistance values can be (re-)established. Additionally or alternatively, the digital control words 250 are not stored in a non-volatile memory and, thus, the resistance(s) need to be programmed each time the pre-distorter 160 is powered-on and/or reset. Further still, the controller 240 could, additionally or alternatively, write one or more digital control words 250 to the pre-distorter 160 to blow one or more trim fuses to set the resistance(s) of one or more resistors. Such blowing of trim fuses results in a permanent setting of the desired resistance values.

To adjust what signals are attenuated and/or passed by the example SAW filter 170, the example controller 240 of FIG. 2 controls the frequency of the local oscillator signal 145 by controlling the example oscillator 147. For example, the controller 240 can write one or more digital control signals and/or values 255 to the oscillator 147 to adjust the frequency of the local oscillator signal 145 generated by the oscillator 147. For instance, when testing and/or adjusting the pre-distortion performed by the pre-distorter 160, the example controller 240 of FIG. 2 instructs the oscillator 147 to generate a local oscillator signal 145 having a frequency such that one or more error signals (e.g., undesired frequencies, images and/or sidebands) fall within the passband of the SAW filter 170. When testing and/or adjusting of the pre-distorter 160 is complete, the controller 240 may instruct the oscillator to generate a local oscillator signal 145 having a frequency such that one or more desired signals fall within the passband of the SAW filter 170.

The example controller 240 of FIG. 2 may be implemented by one or more of any of a variety of processors such as, for example, a microprocessor, a microcontroller, a digital signal processor (DSP), an advanced reduced instruction set computing (RISC) machine (ARM) processor, etc. For example, the controller 240 could execute coded instructions which may be present in a main memory of the processor (e.g., within a random-access memory (RAM) and/or a read-only memory (ROM)) and/or within an on-board memory of the processor. The example controller 240 of FIG. 2 may carry out, among other things, the example machine accessible instructions illustrated in FIG. 5. An example DSP that may be used to implement the example controller 240 is described below in connection with FIG. 6.

In some examples, the example pre-distorter 160 and the example analog module 135 of FIGS. 1 and/or 2 are implemented together within a single IC. To calibrate the pre-distortion performed by the pre-distorter 160, the example tester 205 of FIG. 2 may implemented as part of an IC test platform (e.g., a factory test fixture) that tests, trims and/or calibrates such a single IC prior to shipment to a customer. Such an IC test platform would include other portions of the example quadrature transmitter 210, and the combined analog modulator 135 and pre-distorter 160 IC could be inserted into a socket of the IC test platform. The example controller 240 tests and/or measures I/Q distortion of the analog modulator 135 and adjusts the pre-distorter 160 until the resulting I/Q distortion is acceptable (e.g., until one or more error signals (e.g., undesired frequencies, images and/or sidebands) are sufficiently reduced). In such an example, the parameters of the pre-distorter 160 determined by the example controller 240 are written to and retained by the pre-distorter 160 when the combined IC is removed from the IC test platform. For example, the parameters could be written to a programmable non-volatile memory and/or be used to blow trim fuses of the combined IC.

The example tester 205 of FIG. 2 may also be implemented as part of a piece of equipment (e.g., a wireless modem) that includes the quadrature transmitter 210 (e.g., on a circuit board that implements the quadrature transmitter 210). For example, the controller 240 could be implemented by a controller and/or processor of the piece of equipment that also performs other functions for the piece of equipment (e.g., configuration, overall control, diagnostics, etc.). The controller 240 may be used to aperiodically and/or periodically monitor the I/Q distortion of the quadrature transmitter 210 and make appropriate adjustments to the pre-distortion performed by the pre-distorter 160. For example, when the quadrature transmitter 210 is not currently being used to transmit user data 118 (e.g., at power-up and/or reset), the controller 240 could adjust the frequency of the local oscillator signal 145 to measure the current I/Q distortion. Additionally or alternatively, an additional SAW filter could be implemented in parallel with the SAW filter 170 to couple one or more error signals (e.g., undesired frequencies, images and/or sidebands) to the tester 205 while the quadrature transmitter 210 is transmitting user data 118.

While an example manner of implementing the example tester 205 is illustrated in FIG. 2, the tester 205 may be implemented using any number and/or type(s) of alternative and/or additional processors, devices, components, circuits, modules, interfaces, etc. Further, the processors, devices, components, circuits, modules, elements, interfaces, etc. illustrated in FIG. 2 may be combined, re-arranged, eliminated and/or implemented in any other way. For example, the example analog modulator 135 and the example pre-distorter 160 may be implemented together within a single IC. Additionally, the example signal strength measurer 230, the example controller 240 and/or, more generally, the example tester 205 may be implemented as any combination of firmware, software, logic and/or hardware. Moreover, the example tester 205 and/or the example quadrature transmitter 210 may include additional processors, devices, components, circuits, interfaces and/or modules than those illustrated in FIG. 2 and/or may include more than one of any or all of the illustrated processors, devices, components, circuits, interfaces and/or modules. For example, the quadrature transmitter 210 may include a second SAW filter.

Figure 3A:
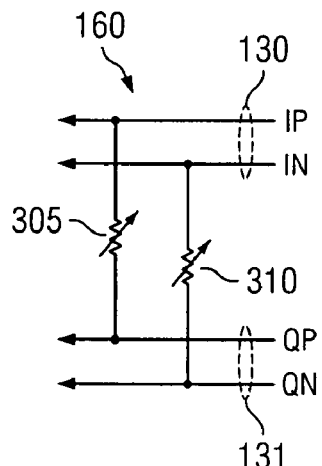
FIGS. 3A and 3B illustrate example manners of implementing any or all of the example pre-distorters of FIGS. 1 and/or 2.
Figure 3B:
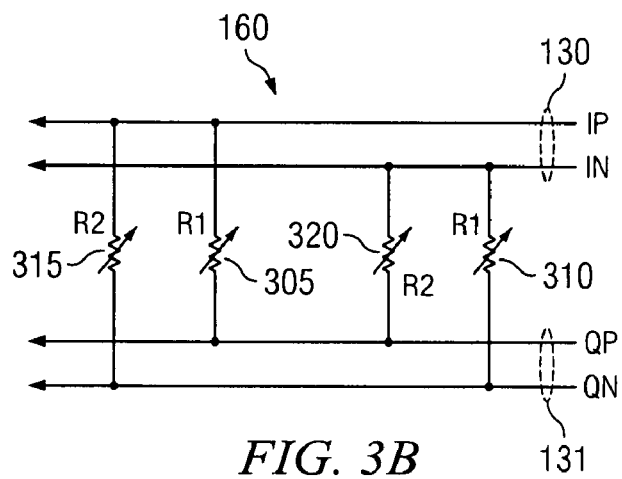

FIGS. 3A and 3B illustrate example manners of implementing any or all of the example pre-distorters 160 of FIGS. 1 and 2. To couple (e.g., add) a fraction of the in-phase component 130 to the quadrature component 131, the example pre-distorter 160 of FIG. 3A includes an impedance 305 (e.g., a resistor). Likewise, to couple (e.g., add) a portion (e.g., fraction) of the quadrature component 131 to the in-phase component 130, the example pre-distorter 160 of FIG. 3A includes an impedance 310 (e.g., a resistor). As used herein, the term impedance refers to any type(s) of materials and/or material configurations having an electrical resistance property. Collectively, the resistors 305 and 310 couple the in-phase component 130 and quadrature component 131 together. The example resistors 305 and 310 of FIG. 3A are adjustable resistors. For example, the example resistors 305 and 310 may be implemented as digital potentiometers (e.g., controllable by writing digital control signals and/or registers) and/or as trimmable resistors (e.g., controllable by blowing fuses). By controlling the resistances of the resistors 305, 310, the pre-distortion performed by the pre-distorter 160 can be controlled. In particular, the resistance values determine the amount of phase and/or amplitude correction performed by the example pre-distorter 160.

FIG. 3B illustrates an alternative example manner of implementing any or all of the example pre-distorters 160 of FIGS. 1 and 2. To allow for an opposite phase correction to be performed, the example pre-distorter 160 of FIG. 3B includes two additional impedances (e.g., resistors) 315 and 320 that are coupled between opposite phases of the in-phase and quadrature signal 130 and 131. If a phase correction in a first direction needs to be performed, then resistors 315 and 320 are programmed to an infinite resistance (e.g., open circuit) while the resistance(s) of the resistors 305 and 310 are adjusted. If a phase correction in an opposite direction is needed, then the resistors 305 and 310 are programmed to an infinite resistance (e.g., open circuit) while the resistance(s) of the resistors 315 and 320 are adjusted. In the illustrated example of FIG. 3B, the resistors 305 and 310 are each set to a first resistance (e.g., R1), while the resistors 315 and 320 are each set to a different resistance (e.g., R2).

The example resistors 305, 310, 315 and 320 of FIG. 3B are adjustable resistors. For example, the example resistors 305, 310, 315 and 320 may be implemented as digital potentiometers (e.g., controllable by writing digital control signals and/or registers) and/or as trimmable resistors (e.g., controllable by blowing fuses). By controlling the resistances of the resistors 305, 310, 315 and 320, the pre-distortion performed by the pre-distorter 160 can be controlled. In particular, the resistance values (e.g., R1 and R2) determine the amount of phase and/or amplitude correction performed by the example pre-distorter 160.

While example manners of implementing a pre-distorter 160 are illustrated in FIGS. 3A and 3B, a pre-distorter 160 may be implemented using any number and/or type(s) of alternative and/or additional devices, components and/or circuits. For example, a pre-distorter 160 for a quadrature transmitter implemented with single-ended analog signals may be implemented with a single resistor to perform phase correction in a single direction, or with an resistor and an amplifier to perform phase correction in both directions. Additionally, the example impedances 305, 310, 315 and/or 320 may be implemented as one or more passive, reactive (e.g., capacitor, inductor, etc.) and/or active (operation amplifier, transistor, etc.) components, circuit board traces, IC traces, etc. and/or any combination thereof. Further, the devices, components and/or circuits illustrated in FIGS. 3A and/or 3B may be combined, re-arranged, eliminated and/or implemented in any other way. Moreover, the pre-distorters 160 of FIG. 3A and 3B may include additional devices, components and/or circuits than those illustrated in FIGS. 3A and 3B and/or may include more than one of any or all of the illustrated devices, components, and/or circuits.

Figure 4A:
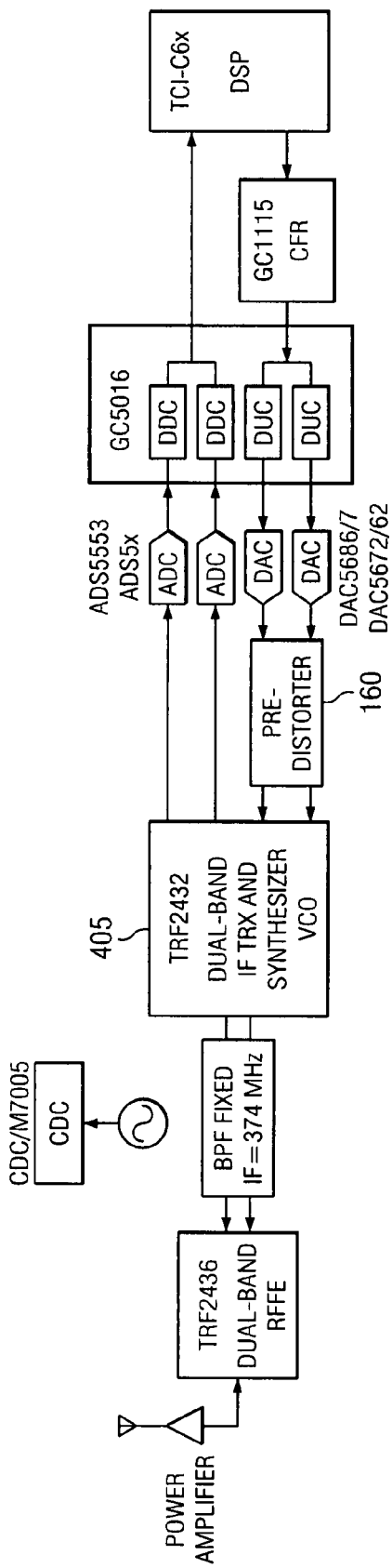
FIGS. 4A and 4B illustrate example wireless systems constructed using any of the example pre-distorters of FIGS. 1, 2, 3A and/or 3B.
Figure 4B:
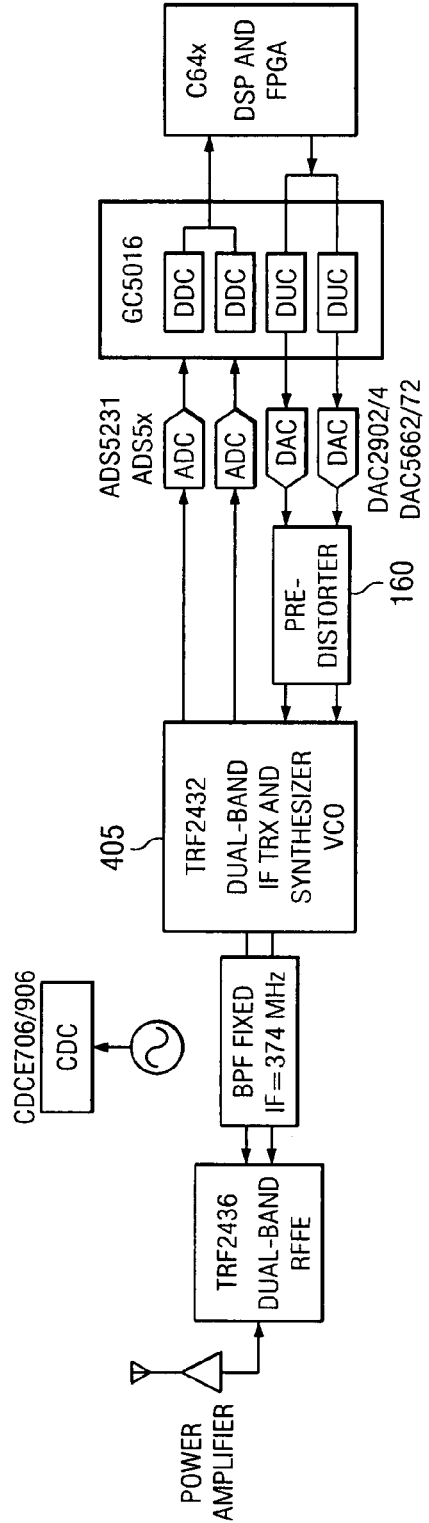

FIGS. 4A and 4B illustrate schematic diagrams of example wireless communication systems that include any of the example pre-distorters of FIGS. 1, 2, 3A and 3B. The example wireless communication system of FIG. 4A implements a 5.8 GHz Institute of Electrical and Electronics Engineers (IEEE) 802.16 (a.k.a. WiMax) wireless basestation. The example wireless communication system of FIG. 4B implements a 5.8 GHz WiMax modem (e.g., customer premise equipment).

While illustrated separately in FIGS. 4A and 4B, the pre-distorter 160 may be implemented together with the TRF2432 IC 405 within a single IC.

Figure 5:
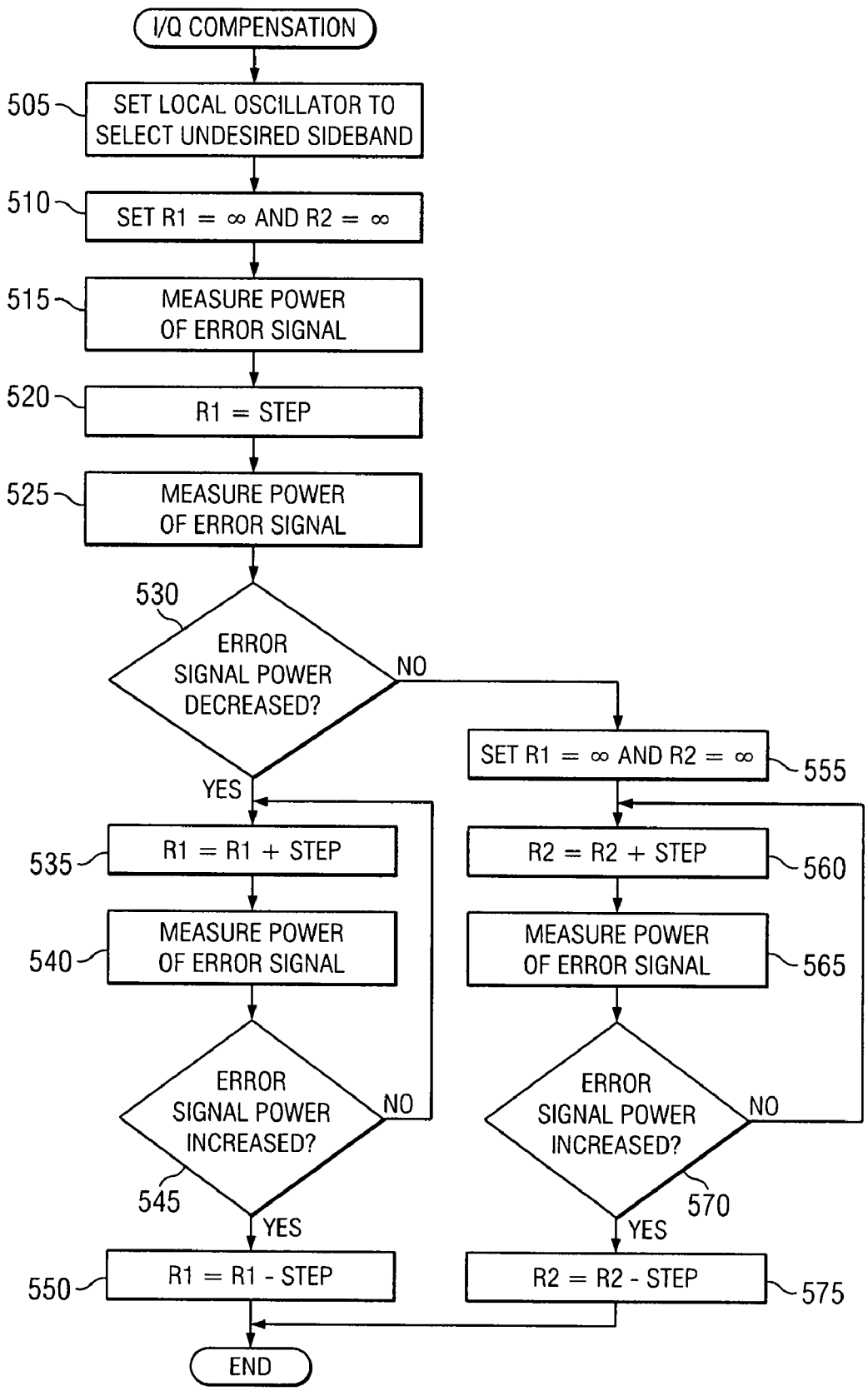
FIG. 5 is a flowchart representative of example machine accessible instructions that may be carried out to implement the example controller of FIG. 2 and/or, more generally, to control any of the example pre-distorters described herein.

FIG. 5 is a flowchart representative of example machine accessible instructions that may be executed to implement the example controller 240 of FIG. 2 and/or, more generally, to adjust the pre-distortion performed by a particular pre-distorter 160. The example machine accessible instructions of FIG. 5 may be executed by a processor, a controller and/or any other suitable processing device. For example, the example machine accessible instructions of FIG. 5 may be embodied in coded instructions stored on a tangible medium such as a flash memory, ROM and/or RAM associated with a processor (e.g., the example processor 605 discussed below in connection with FIG. 6). Alternatively, some or all of the example flowchart of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example flowchart of FIG. 5 and/or the example controller 240 may be implemented manually or as any combination(s) of any of the foregoing techniques, for example, any combination of firmware, software, discrete logic and/or hardware. Further, although the example machine accessible instructions of FIG. 5 are described with reference to the flowchart of FIG. 5, persons of ordinary skill in the art will readily appreciate that many other methods of implementing the example controller 240 and/or, more generally, of adjusting the pre-distortion performed by a particular pre-distorter 160 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 5 may be carried out sequentially and/or carried out in parallel by, for example, separate processing threads, processors, devices, discrete logic, circuits, etc.

The example machine accessible instructions of FIG. 5 begin when the pre-distortion performed by a pre-distorter (e.g., any or all of the example pre-distorters 160 of FIGS. 1, 2, 3A and/or 3B) is to be controlled, set and/or adjusted. A controller (e.g., the example controller 240 of FIG. 2) sets the frequency of a local oscillator (e.g., the example oscillator 147) to select one or more error signals (e.g., undesired frequencies, images and/or sidebands) (block 505).

The controller sets the resistance (e.g., R1 and R2 of FIG. 3B) of the coupling resistors (e.g., the example resistors 305, 310, 315 and 320) to infinite (e.g., an open circuit) so that no pre-distortion is performed (block 510). A signal strength measurer (e.g., the example signal strength measurer 230) measures the current signal strength of the error signal(s) (block 515). The controller sets the resistance R1 of one set of the coupling resistors to the step size between supported resistance values (block 520) and the signal strength measurer re-measures the strength of the error signal(s) (block 525).

If by setting R1 to the step size at block 520 the power of the error signal(s) is decreased (block 530), the controller increments the value of R1 (block 535). The signal strength measurer then re-measures the strength of the error signal(s) (block 540). If the power of the error signal(s) has been further decreased (block 545), control returns to block 535 to make further adjustments to the value of R1. If the power of the error signal(s) has increased (block 545), the controller changes the value of R1 back to its previous value by decrementing R1 (block 550). Control then exits from the example machine accessible instructions of FIG. 5.

Returning to block 530, if the signal strength of the error signal(s) did not decrease by setting R1 to the step size (block 530), the controller sets R1 to infinity (e.g., open circuit) and sets R2 to the step size (blocks 555 and 560) to perform pre-distortion with an opposite phase correction. The signal strength measurer then re-measures the strength of the error signal(s) (block 565).

If the power of the error signal(s) has been further decreased (block 570), control returns to block 560 to make further adjustments to the value of R2. If the power of the error signal(s) has increased (block 570), the controller changes the value of R2 back to its previous value by decrementing R2 (block 575). Control then exits from the example machine accessible instructions of FIG. 5.

Figure 6:
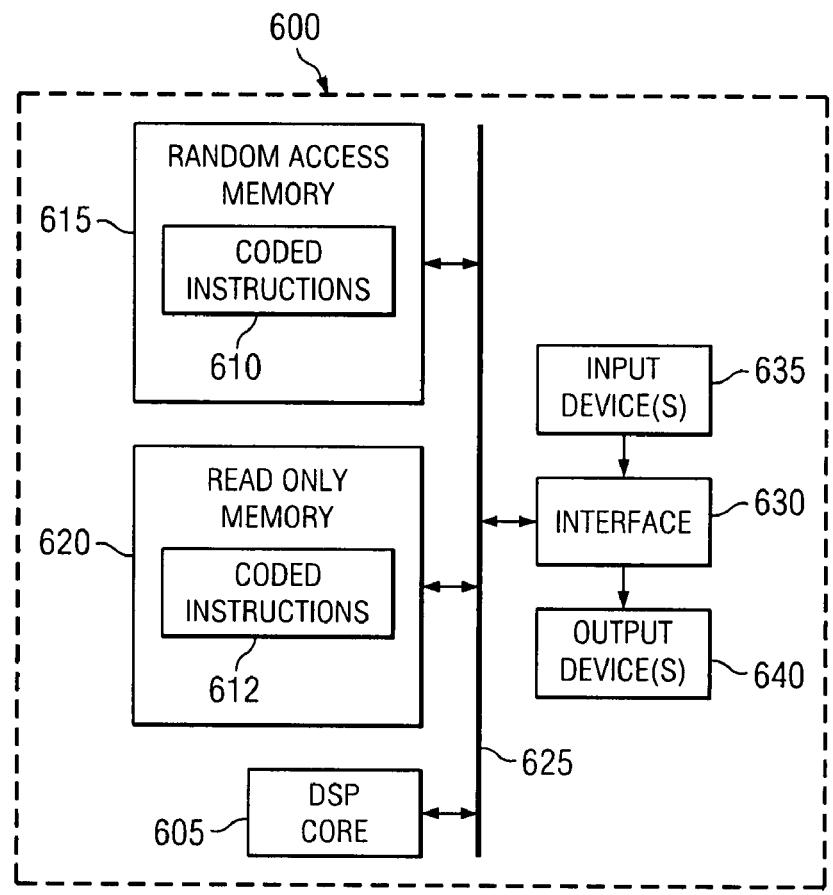
FIG. 6 is a schematic illustration of an example digital signal processor that may be used and/or programmed to carry out the example machine accessible instructions of FIG. 5 and/or to implement the example controller of FIG. 2.

FIG. 6 is a block diagram of an example DSP 600 capable of implementing the apparatus and methods disclosed herein. For example, the DSP 600 can be implemented by one or more digital signal processors (e.g., TMS320C54x™, TMS320C6x™, OMAP™) from Texas Instruments Incorporated, or other devices from other manufacturers.

The DSP 600 of the instant example includes any type(s) and/or numbers of DSP cores, one of which is illustrated in FIG. 6 with reference numeral 605. The example DSP core 605 is a general purpose programmable processor with enhancements making it more suitable for real-time processing of digital signals. The DSP core 605 executes coded instructions 610 and/or 612 present in main memory of the DSP core 605. The DSP core 605 may implement, among other things, the example controller 240 of FIG. 2. The DSP core 605 is in communication with the main memory (including a ROM 620 and/or a RAM 615) via a bus 625. The RAM 615 may be implemented by dynamic RAM (DRAM), synchronous DRAM (SDRAM), and/or any other type of RAM device, and the ROM 620 may be implemented by flash memory and/or any other desired type of memory device. Access to the memories 615 and 620 maybe controlled by a memory controller (not shown).

The DSP 600 also includes an interface circuit 630. The interface circuit 630 may be implemented by any type of interface standard, such as an external memory interface (EMIF), serial port, general purpose input/output, etc. One or more input devices 635 and one or more output devices 640 are connected to the interface circuit 630. The output devices 640 may be used to, for example, send control values and/or signals to a local oscillator 147 and/or a pre-distorter 160.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a modulator having:
      a positive in-phase terminal that receives a positive portion of an in-phase signal; and
      a negative in-phase terminal that receives a negative portion of the in-phase signal;
      a positive quadrature terminal that receives a positive portion of a quadrature signal; and
      a negative quadrature terminal that receives a negative portion of the quadrature signal;
   a local oscillator that is coupled to the modulator; and
   an adjustable resistor network having:
      a first variable resistor that is coupled between positive in-phase terminal and the positive quadrature terminal;

a second variable resistor that is coupled between the negative in-phase terminal and the negative quadrature terminal;

a third variable resistor that is coupled between the positive in-phase terminal and the negative quadrature terminal; and a fourth variable resistor that is coupled between the negative in-phase terminal and the positive quadrature terminal.

2. The apparatus of claim 1, wherein each of the first through fourth variable resistors of the adjustable resistor network further comprises a digital potentiometer.

3. The apparatus of claim 1, wherein each of the first through fourth variable resistors of the adjustable resistor network further comprises a trimmable resistor.

4. An apparatus comprising:

a modulator having a first input terminal and a second input terminal, wherein the first input terminal receives an in-phase signal, and wherein the second input terminal receives a quadrature signal;

a local oscillator that is coupled to the modulator;

an adjustable resistor network that is coupled between the first and second terminals of the modulator;

an amplifier that is coupled to the modulator;

a filter that is coupled to the amplifier;

a coupler that is coupled to the filter; and a controller that is coupled to the coupler and the adjustable resistor network, wherein the controller adjusts the impedance of the adjustable resistor network based at least in part on an output from the filter.

5. The apparatus of claim 4, wherein the adjustable resistor network further comprises a digital potentiometer.

6. The apparatus of claim 4, wherein the adjustable resistor network further comprises a trimmable resistor.

7. The apparatus of claim 4, wherein the in-phase signal is differential, and wherein first input terminal further comprises:

a positive in-phase terminal that receives a positive portion of the in-phase signal; and a negative in-phase terminal that receives a negative portion of the in-phase signal.

8. The apparatus of claim 7, wherein the quadrature signal is differential, and wherein second input terminal further comprises:

a positive quadrature terminal that receives a positive portion of the quadrature signal; and a negative quadrature terminal that receives a negative portion of the quadrature signal.

9. The apparatus of claim 8, wherein the adjustable resistor network further comprises:

a first variable resistor that is coupled between positive in-phase terminal and the positive quadrature terminal; and a second variable resistor that is coupled between the negative in-phase terminal and the negative quadrature terminal.

10. The apparatus of claim 9, wherein the adjustable resistor network further comprises:

a third variable resistor that is coupled between the positive in-phase terminal and the negative quadrature terminal; and a fourth variable resistor that is coupled between the negative in-phase terminal and the positive quadrature terminal.

11. The apparatus of claim 10, wherein the apparatus further comprises a signal strength indicator that is coupled between the coupler and the controller.

12. The apparatus of claim 11, wherein the apparatus further comprises:

a baseband modem;

an in-phase digital-to-analog converter (DAC) that is coupled to the baseband modem and to the positive and negative in-phase terminals of the modulator; and a quadrature DAC that is coupled to the baseband modem and to the positive and negative quadrature terminals of the modulator.

13. The apparatus of claim 4, wherein the filter further comprises a surface acoustic wave (SAW) filter.

\* \* \* \* \*